United States Patent
Yamamoto

(10) Patent No.: US 8,293,671 B2
(45) Date of Patent: Oct. 23, 2012

(54) ELECTRODE CATALYST AND METHOD FOR PRODUCING SAME

(75) Inventor: Shinji Yamamoto, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1127 days.

(21) Appl. No.: 11/815,805

(22) PCT Filed: Feb. 21, 2006

(86) PCT No.: PCT/JP2006/303007
§ 371 (c)(1),
(2), (4) Date: Aug. 8, 2007

(87) PCT Pub. No.: WO2006/088194
PCT Pub. Date: Aug. 24, 2006

(65) Prior Publication Data
US 2009/0029216 A1   Jan. 29, 2009

(30) Foreign Application Priority Data
Feb. 21, 2005   (JP) .................. 2005-044463

(51) Int. Cl.
*H01M 4/88* (2006.01)
*H01M 4/02* (2006.01)
*H01M 4/36* (2006.01)
*H01M 4/92* (2006.01)
*H01M 4/94* (2006.01)
*H01M 4/90* (2006.01)
*B01J 23/40* (2006.01)
*B01J 23/74* (2006.01)

(52) U.S. Cl. ........ 502/101; 502/185; 429/524; 429/525; 429/526

(58) Field of Classification Search ............ 502/101, 502/185; 429/524–526
See application file for complete search history.

(56) References Cited

U.S. PATENT DOCUMENTS

| | | | |
|---|---|---|---|
| 5,061,671 A * | 10/1991 | Kitson et al. .................. 502/185 |
| 5,702,755 A | 12/1997 | Mussell | |
| 5,882,810 A | 3/1999 | Mussell et al. | |
| 6,312,845 B1 | 11/2001 | Scortichini et al. | |
| 6,417,133 B1 * | 7/2002 | Ebner et al. .................. 502/185 |
| 7,037,873 B2 * | 5/2006 | Kato .............................. 502/180 |
| 7,205,255 B2 * | 4/2007 | Yamamoto ..................... 502/101 |
| 7,566,388 B2 * | 7/2009 | Sasaki et al. .................. 204/283 |
| 7,659,224 B2 * | 2/2010 | Shimazaki et al. ........... 502/180 |
| 7,879,752 B2 * | 2/2011 | Sun et al. ...................... 502/185 |
| 2003/0176277 A1 | 9/2003 | Suh et al. | |
| 2004/0067847 A1 * | 4/2004 | Kato .............................. 502/325 |

FOREIGN PATENT DOCUMENTS

| | | |
|---|---|---|
| EP | 0 569 062 A2 | 11/1993 |
| EP | 1 164 651 A1 | 12/2001 |
| JP | 2000-268828 A | 9/2000 |
| JP | 2001-240755 A | 9/2001 |
| JP | 2002-260686 A | 9/2002 |
| JP | 2003-109608 A | 4/2003 |
| JP | 2004-63409 A | 2/2004 |
| JP | 2004-139789 A | 5/2004 |
| JP | 2004-178814 A | 6/2004 |
| JP | 2005-5257 A | 1/2005 |
| WO | 2004/055244 * | 7/2004 |

OTHER PUBLICATIONS

Liu et al., "Synthesis and characterization of PtRu/C catalysts from microemulsions and emulsions", J. Mater. Chem., 2002, vol. 12, pp. 2453-2458.

Liu et al., "Preparation and characterization of Pt/C and Pt-Ru/C electrocatalysts for direct ethanol fuel cells", Journal of Power Sources, 2005, vol. 149, pp. 1-7.

Zeng et al., "Effects of preparation conditions on performance of carbon-supported nanosize Pt-Co catalysts for methanol electro-oxidation under acidic conditions", Journal of Power Sources, 2005, vol. 140, pp. 268-273.

Liu et al., "Carbon-supported Pt nanoparticles as catalysts for proton exchange membrane fuel cells", Journal of Power Sources, 2005, vol. 139, pp. 73-78.

Colon-Mercado et al., "Stability of platinum based alloy cathode catalysts in PEM fuel cells", Journal of Power Sources, 2006, vol. 155, pp. 253-263.

* cited by examiner

*Primary Examiner* — Patricia L Hailey
(74) *Attorney, Agent, or Firm* — Foley & Lardner LLP

(57) ABSTRACT

Provided is a method for suppressing corrosion of a carbon material, which acts as a carrier in a catalyst layer of PEFC. The present invention relates to an electrode catalyst produced by subjecting a carbon material having a noble metal catalyst supported thereon to heat treatment under inert gas atmosphere.

22 Claims, No Drawings

ELECTRODE CATALYST AND METHOD FOR PRODUCING SAME

TECHNICAL FIELD

The present invention relates to an electrode catalyst, in particular an electrode catalyst for a fuel cell. More specifically the present invention relates to an electrode catalyst, in particular an electrode catalyst for a fuel cell, which is excellent in durability. A fuel cell provided with an electrode catalyst of the present invention can be used, for example, as a vehicle drive source or a stationary power source.

BACKGROUND ART

Recently, in response to social needs or movement with the background of energy and environmental issues, a fuel cell has been noticed as a vehicle drive source and a stationary power source. A fuel cell is classified into various types based on electrolyte types or electrode types, including, as typical ones, an alkali type, a phosphoric acid type, a molten carbonate salt type, a solid electrolyte type and a proton-exchange membrane type. Among these, because of operability at low temperature (usually equal to or lower than 100° C.), a proton-exchange membrane fuel cell (PEFC) has been noticed, and development and practical applications thereof have recently been progressing as a low pollution type power source for an automobile. Although as applications of PEFC, a vehicle drive source or a stationary power source has been studied, durability over a long period is required for these applications.

In an electrode catalyst layer, where a cell reaction proceeds in a fuel cell, a catalyst, a carrier supporting the catalyst and a proton conductive polyelectrolyte (an ionomer) have been usually included, and an electrode catalyst layer of a three-dimensional void structure has been formed by binding a carrier or a carrier supporting a catalyst using an ionomer as a binder. In this case, a noble metal such as platinum or the like, or an alloy containing a noble metal element has been known as a catalyst, and a conductive carbon material represented by carbon black has been known as a carrier. As a method for supporting a platinum catalyst onto a carbon material, a method which comprises using a strongly acidic raw material such as platinum chloride, platinum nitrate to support an active species onto the surface of a carbon material, dinitrodiamine platinate or the like, and drying the supported material at equal to or lower than 200° C., has been adopted (for example, see JP-A-2004-139789, in particular, paragraphs from (0041) to (0043)).

In PEFC, however, the inside of an anode catalyst layer is generally purged with air to remove fuel (hydrogen) included therein, when operation is stopped, and supply of fuel (hydrogen) in re-start operation forms a local cell in the anode catalyst layer, which makes the inside of a cathode catalyst layer exposed in high voltage (equal to or higher than about 0.8 V). Then, exposure to high voltage would induce hydrolysis of a noble metal such as platinum or the like to generate oxygen, which results in oxidative corrosion of a carbon material at the vicinity of the noble metal, and destruction of the electrode layer structure (the three-dimensional void structure). Further, such destruction of three-dimensional void structure by progress of oxidative corrosion of a carbon material caused by repeated start-stop operations would reduce gas diffusivity or drainage of generated water, increase gas concentration over-voltage amount, induce flooding easily, and deteriorate power generation performance. In addition, it would incur a problem of elution of a noble metal as catalyst such as platinum or the like, and result in accelerated decomposition of an ionomer.

DISCLOSURE OF INVENTION

Accordingly, it is an object of the present invention to provide a method for suppressing corrosion of a carbon material, which acts as a carrier in a catalyst layer of PEFC.

Conventionally, in order to suppress carbon corrosion occurring in a cathode catalyst layer at start-stop operation, it has been useful to use a highly crystalline carbon material (carbon black) with high hydrophobic nature, as a carrier, or in order to suppress elution of platinum occurring in a cathode catalyst layer at start-stop operation, it has been useful to increase particle diameter of catalyst (Pt) particles, by which improvement of durability and extension of lifetime has been challenged. However, a highly crystalline carbon material has small specific surface, and thus has a problem of reducing dispersibility of a catalyst (for example Pt, or Pt alloy) component; also, increase in particle diameter of catalyst particles had a problem of reducing power generation performance due to its small electrochemical surface area. As described above, conventional technique had a problem in terms that durability and performance were not satisfied at the same time.

Accordingly, the present inventors have intensively studied a way to satisfy both durability and performance, to find that in order to enhance performance, by subjecting a carbon material on which a noble metal catalyst having small particle diameter is supported in a high dispersion state, to heat treatment under inert gas atmosphere, particle diameter can be increased by sintering of a noble metal, while maintaining catalyst particles in a highly dispersed state, by which elution of catalyst particles can be suppressed and durability improvement and lifetime extension can be attained. Further, it has also be found that, in heat treatment, the amorphous moiety at the surface of a carbon material can be eliminated by means of catalytic action of a noble metal catalyst (for example Pt, or a Pt alloy), and degree of graphitization of a carrier surface can be enhanced, and resistance against carbon corrosion can be further enhanced. Based on the above knowledge, the present invention has been completed.

Namely, the above object can be attained by an electrode catalyst produced by subjecting a carbon material having a noble metal catalyst supported thereon to heat treatment under inert gas atmosphere.

In addition, the above object can also be attained by an electrode catalyst which is produced by subjecting a carbon material having a noble metal catalyst supported thereon to heat treatment under atmosphere of inert gas, or mixed gas of reducing gas or oxidizing gas with inert gas, and has slightly increased degree of graphitization determined by a Raman spectrum band after the heat treatment as compared with degree of graphitization before the heat treatment.

The other objectives, features and characteristics of the present invention will be clear from the following explanation and preferable embodiments exemplified in the accompanying drawings.

BEST MODE FOR CARRYING OUT THE INVENTION

Explanation will be given in detail below on embodiments of the present invention.

A first aspect of the present invention relates to an electrode catalyst produced by subjecting a carbon material having a noble metal catalyst supported thereon to heat treatment under inert gas atmosphere. In addition, a second aspect of the present invention relates to a method for producing an electrode catalyst comprising: a step for supporting a noble metal catalyst on a carbon material; and a step for subjecting the carbon material having a noble metal catalyst supported thereon to heat treatment under inert gas atmosphere. By preparing a catalyst in a highly dispersed state of small catalyst particles in advance, and then subjecting the catalyst to heat treatment, particle diameter can be increased by sintering catalyst particles, while a highly dispersed state of catalyst particles can be maintained.

Corrosion of a carbon material having a noble metal catalyst supported thereon can be considered to be caused by amorphous moiety present at the surface of a carbon material. For example, in the case where a strongly acidic raw material such as platinum chloride, platinum nitrate, dinitrodiamine platinate or the like is used to support a noble metal catalyst on a carbon material, amorphous moiety would be oxidized to induce formation of a hydroxyl group or an organic functional group on the surface of the carbon material. It may be estimated that exposure of the carbon material subjected under such modification to a high voltage state at start-stop operation, generates oxygen by electrolysis of water at the vicinity of the noble metal catalyst, resulting in easy progress of oxidative corrosion on the surface of carbon material. Although enhancement of crystallinity of a carbon material can reduce the amorphous moiety, it is considered that corrosion resistance of a carrier would be deteriorated after all; because similar oxidation may be generated during a supporting process of a noble metal catalyst. According to the present invention, however, because a noble metal catalyst is firstly supported on a carbon material, and then the resultant catalyst-supporting carbon is subjected to heat treatment at high temperature, a hydroxyl group or an organic functional group or the like formed on the surface of the carbon material during catalyst preparation can be eliminated. By subjecting the carbon material to such heat treatment after supporting a noble metal thereon, the surface of carbon material can be stabilized and corrosion of a carbon material can be suppressed. Furthermore, because heat treatment of a carbon material having a noble metal catalyst supported thereon under inert gas atmosphere can eliminate amorphous moiety on the surface of carbon material by means of catalytic action of a noble metal such as platinum or a platinum alloy or the like, degree of graphitization of a carbon material as a carrier can be increased, and resistance to carbon corrosion can be significantly enhanced. In addition, in the case of heat treatment under inert gas atmosphere, it is estimated that a functional group may be oxidized by oxygen derived from a partially oxidized noble metal (for example, $PtO_x$), or a functional group on the surface of carbon material may be thermally decomposed, to be eliminated. It should be noted that the present invention should not be limited by the above estimation.

Therefore, in an electrode catalyst of the present invention, because high gas dispersion and drainage can be secured from the initial stage to after long-term service, high power generation performance from low current density to high current density can be obtained, and also durability can be enhanced and high lifetime characteristics can be obtained.

As described above, because an amorphous moiety on the surface of a carbon material having a noble metal catalyst supported thereon can be eliminated by subjecting the carbon material to heat treatment under inert gas atmosphere in accordance with the present invention, degree of graphitization of a carbon material as a carrier, in particular, degree of graphitization determined by a Raman spectrum band can be increased. Therefore, an electrode catalyst which produced by subjecting a carbon material having a noble metal catalyst supported thereon to heat treatment under inert gas atmosphere or under atmosphere of mixed gas of reducing gas or oxidizing gas with inert gas, and has slightly increased degree of graphitization determined by a Raman spectrum band after the heat treatment as compared with degree of graphitization before the heat treatment may also form another aspect of the present invention.

In the present specification, "degree of graphitization determined by a Raman spectrum band" is used as an index showing enhancement of corrosion resistance of a carbon material having a noble metal catalyst supported thereon, and defined as a ratio ($I_{1355}/I_{1580}$) of intensity ($I_{1355}$) of $\Delta\upsilon_{1355}$ (peak adjacent at 1355 $cm^{-1}$ in Raman spectrum) to intensity ($I_{1580}$) of $\Delta\upsilon_{1580}$ (peak adjacent at 1580 $cm^{-1}$ in Raman spectrum). Alternatively, it simply may also be defined as a ratio ($Iw_{1355}/Iw_{1580}$) of half bandwidth ($Iw_{1355}$) of $\Delta\upsilon_{1355}$ (peak adjacent at 1355 $cm^1$ in Raman spectrum) to half bandwidth ($Iw_{1580}$) of $\Delta\upsilon_{1580}$ (peak adjacent at 1580 $cm^{-1}$ in Raman spectrum). Namely, small value of ($I_{1355}/I_{1580}$) or ($Iw_{1355}/Iw_{1580}$) determined by a Raman spectrum band means increase in degree of graphitization of a carbon material (namely, disappearance of amorphous moiety), and thus enhancement of corrosion resistance of a carbon material having a noble metal catalyst supported thereon.

As used herein, "Raman spectrum" is a spectrum showing which wavelength of light is scattered in which degree of intensity, on light scattered by Raman effect, and degree of graphitization of a carbon material according to the present invention can be evaluated by intensity of peaks derived from carbon coking appeared at 1355 $cm^{-1}$ and 1580 $cm^{-1}$. In the present invention, Raman spectrum is measured under conditions of an excitation wavelength of 532 nm, an output power of 3 mW, and an exposure of 30 seconds×5 times of integration, using a microscopic laser Raman spectroscopic analysis apparatus, Holo Lab 5000R (manufactured by Kaiser Optical System Inc.).

In the present invention, an increasing ratio of degree of graphitization, after heat treatment, relative to before heat treatment, determined by a Raman spectrum band, as expressed as a ratio of $I_{1355}/I_{1580}$ after heat treatment divided by $I_{1355}/I_{1580}$ before heat treatment, is preferably below 1. Alternatively, the increasing ratio, when expressed as $Iw_{1355}/Iw_{1580}$ after heat treatment divided by $Iw_{1355}/Iw_{1580}$ before heat treatment, is preferably below 1.

However, they are only estimation methods for degree of graphitization of a carbon material, and the present invention should not be limited to embodiments wherein corrosion resistance is enhanced according to such estimation methods.

As for noble metal catalyst used in the present invention, a catalyst used in a cathode catalyst layer is not especially limited, as long as having catalytic activity in a reduction reaction of oxygen, and a known catalyst may be used similarly; in addition, also a catalyst used in an anode catalyst layer is not especially limited, as long as having catalytic activity in an oxidation reaction of hydrogen, and a known catalyst may be used similarly. Specifically, the noble metal catalyst is selected among metals including platinum, ruthenium, iridium, rhodium, palladium, osmium, tungsten, lead, iron, chromium, cobalt, nickel, manganese, vanadium, molybdenum, gallium, aluminum or the like; and alloys thereof; or the like. Among these, one containing at least platinum is preferably used to enhance catalytic activity, poisoning resistance against carbon monoxide or the like, heat resistance or the like. Therefore, as the noble metal catalyst, platinum, or a platinum alloy containing platinum (Pt) and at least one metal selected from the group consisting of iridium (Ir), rhodium (Rh), indium (In), palladium (Pd), silver (Ag) and gold (Au) is preferably used. More preferably, a noble metal catalyst is composed of platinum (Pt), or a platinum alloy having composition represented by the formula: $Pt_aX_b$. In this formula, X represents at least one element selected from the group consisting of Ir, Rh, In, Pd, Ag and Au. "a" represents an atomic ratio of platinum (Pt) and is 0.7 to 1.0. "b" represents a total atomic ratio of the above element X and is 0 to 0.3. In this case, total of "a" and "b" is 1.0 (a+b=1.0). A platinum alloy having such a composition can easily provide a solid solution of the added metal components and platinum, and attain improvement of power generation performance due to the added metal components, and also manifest excellent catalytic activity and stability of catalyst particles. As used herein, "an alloy" is, in general, a generic name of one composed of a metal element added with at least one metal element or non-metal element, and having metallic property. A structure of an alloy includes a eutectic alloy, which is so to speak a mixture, where each of the component elements forms independent crystal; a solid solution where component elements completely dissolves each other; one where component elements form an inter-metallic compound, or a compound between a metal and a non-metal; or the like, and any of these may be used in the present invention. In this case, a noble metal catalyst used in a cathode catalyst layer, and a noble metal catalyst used in an anode catalyst layer may be selected among the above-described ones, as appropriate.

The shape and size of a noble metal catalyst according to the present invention are not especially limited and the similar shape and size of a known noble metal catalyst may be used. A noble metal catalyst is preferably in a particulate shape. In this case, smaller average particle diameter of a noble metal catalyst can provide higher reduction activity of oxygen due to increase in effective electrode surface where electrochemical reaction proceeds. Improvement of reduction activity of oxygen by decreasing particle diameter is called "particle diameter effect", and it has been known that particle diameter of 2 to 3 nm shows maximal reduction activity of oxygen. Further, decreased particle diameter is preferable in terms of attaining high dispersion onto a carbon material. In addition, since by heat treatment according to the present invention, particle diameter can be increased by sintering while maintaining a high dispersion state of catalyst particles, even in using catalyst particles with small particle diameter, elution of a noble metal can be suppressed, durability can be improved and longer lifetime can be attained. Therefore, average particle diameter of noble metal catalyst particles of the present invention, before heat treatment, is preferably 1 to 6 nm, more preferably 2 to 4 nm, and particularly preferably 2 to 3 nm. In this case, average particle diameter of noble metal catalyst particles can be measured by crystal diameter determined by half width value of diffraction peak of a noble metal catalyst in X-ray diffraction, or by average of particle diameter of a noble metal catalyst examined by transmission electron microscope image. In the present invention, average particle diameter of noble metal catalyst particles is determined by measuring particle diameters of particles observed in several to several tens visual fields for a representative sample with a scanning electron microscope, and calculating average of the determined particle diameters. It should be noted that this measurement method generates significant difference in average particle diameter, depending on a sample observed or visual field.

A carbon material used in the present invention is not especially limited as long as being used as a carrier for a noble metal catalyst. It is preferable to have a specific surface area sufficient to have a noble metal catalyst supported thereon in a desired dispersion state, and have electron conductivity sufficient to act as a collector. Specifically, carbon black such as acetylene black, channel black, lampblack, furnace black and the like; and a conductive carbon material such as a carbon nanotube, a carbon nanofiber, a carbon nanohorn, a carbon nanofibril or the like may be used. Carbon black may be subjected to graphitization. These carbon materials, because of having large BET specific surface area, have advantages in providing high dispersion of catalyst components on carrier surface, increasing electrochemical surface area, and obtaining high power generation performance, and also can suppress aggregation of platinum or a platinum alloy, and easily control average particle diameter or particle distribution. In addition, the carbon material may be used alone or in a mixed form of 2 or more members. In a carbon material, impurities may be incorporated in an amount of equal to or less than about 2 to 3% by mass.

As a carbon material, carbon black, in particular, non-graphitized carbon black may be preferably used. In the case where non-graphitized carbon black is used as a carbon material, effects by the present invention can be more remarkably attained. Graphitization of a carbon material can enhance corrosion resistance of a carbon material. Graphitized carbon material, however, tends to have decreased dispersion of noble metal catalyst (for example, platinum) particles due to having small surface area, although they excels in corrosion resistance of a carbon material. In addition, a noble metal catalyst, in particular, platinum, is difficult to be supported on a graphitized layer, which may raise problems that particles of a noble metal catalyst tend to be easily aggregated, or separation thereof from carbon surface by use over a long period of time, because of insufficient adsorption of ionomer caused by high surface hydrophobicity. In the case where non-graphitized carbon black is used as a carbon material, these problems can be suppressed, and also corrosion of a carbon material can be suppressed by heat treatment.

A carbon material may be prepared per se, or a commercially available carbon material may be used. As a commercially available carbon material, Vulcan (registered trademark), Ketjenblack (registered trademark), Black Pearls (registered trademark) or the like may be included.

Specific surface area (BET specific surface area) of a carbon material may be any level as long as being sufficient to have a noble metal catalyst supported thereon in a highly dispersed state. It may be preferably 100 to 2000 $m^2/g$, and more preferably 200 to 1500 $m^2/g$. Such a range can attain supporting of a noble metal catalyst on a carbon material in a highly dispersed state.

Size of a carbon material is not especially limited. In view of easy supporting, catalyst availability, and control of thickness of an electrode catalyst layer within a suitable range, or the like, in the case where a carbon material is particulate, for example, average particle diameter may be preferably in an approximate range of 0.1 to 1 μm.

In an electrode catalyst having a noble metal catalyst supported on a carbon material, amount of the supported noble metal catalyst is not especially limited, and may be selected as appropriate. For example, in a cathode catalyst layer, amount of the supported noble metal catalyst on a carbon material is preferably 30 to 70% by mass, and more preferably 40 to 60% by mass, relative to amount of a carbon material contained in the cathode catalyst layer. In a anode catalyst layer, amount of the supported noble metal catalyst on a carbon material is preferably 5 to 60% by mass, and more preferably 20 to 50% by mass, relative to amount of a carbon material contained in the anode catalyst layer. In this case, the supporting amount within this range can attain high dispersion of noble metal catalyst on the carbon material, and thus excellent power generation performance can be expected. The amount of a noble metal catalyst supported can be determined by inductively-coupled plasma emission spectroscopy (ICP).

In addition, supporting of a noble metal catalyst on a carbon material can be executed by a known method. For example, a known method such as an immersion method, a liquid phase reductive supporting method, an evaporation-to-dryness method, a colloid adsorption method, a spray thermal decomposition method, a reversed micelle method (a microemulsion method) or the like can be used. In this case, as a method for supporting a noble metal catalyst on a carbon material, a method which comprises mixing a carbon material acting as a carrier, and a raw material of a noble metal catalyst, in water under acidic conditions, to support the noble metal catalyst on the carbon material, or the like may be preferably used. As for a supporting method, known knowledge or newly obtained knowledge may be referred to as appropriate. For example, after mixing a raw material of a noble metal catalyst with a carbon material, the carbon material may be dried. In this case, the case where a compound showing strong acidic property in an aqueous solution is used as a raw material of a noble metal catalyst, is particularly beneficial. In the case where a compound showing strong acidic property is used as a raw material, a carbon material is labile to oxidization during a supporting process. Accordingly, in such a case, effects by the present invention, namely stabilization of a carbon material surface by heat treatment at high temperature, can be obtained more remarkably. The expression, "showing strong acidic property", as used herein, means that an aqueous solution of a Pt compound is in a state of a pH of equal to or lower than 3.

A raw material showing strong acidic property is not especially limited. It may preferably include, for example, compounds forming a platinum ion in an aqueous solution, such as nitrate salt, dinitrodiamine salt, sulfate salt, ammonium salt, amine salt, carbonate salt, bicarbonate salt; halides like bromide, chloride, or the like; inorganic salts such as nitrite salt, oxalate salt; carboxylate salts such as formate, or the like; and hydroxide, alkoxide, oxide of the above noble metal or the noble metal alloy. Among theses, a halide, in particular, a chloride, a nitrate salt and a dinitrodiamine salt of the above noble metal or the noble metal alloy may be preferably used, and platinum chloride may be particularly preferable. These raw materials are easy in control of particle diameter of a noble metal catalyst to be supported, and can easily improve dispersibility of a noble metal catalyst.

In this way, by supporting a noble metal catalyst on a carbon material and then subjecting the carbon material to heat treatment under inert gas atmosphere, moiety liable to corrode can be eliminated. Effects to be generated by heat treatment at high temperature include, as well as the above effects, effect of preventing elution of a catalyst metal such as platinum or the like, at the initial stage of service of a fuel cell, by enlarging particle diameter of catalyst particles. Heat treatment at high temperature may result in growth of fine particles by sintering, to reduce fine catalyst particles having an average diameter of below 1 nm, having high surface energy, and being unstable and easily eluted. As a result, elution of a catalyst metal can be suppressed at the initial stage of service of a fuel cell, and degradation with time of a fuel cell can be suppressed. On the other hand, although catalyst particles having an average particle diameter of equal to or larger than 1 nm grow by heat treatment to an average particle diameter of about 3 to 6 nm, the particles thus grown have reduced surface energy of particles themselves and are stabilized. Accordingly, elution of a catalyst metal can also be suppressed at the initial stage of service of a fuel cell, and degradation with time of a fuel cell can be suppressed. Namely, by heat treatment of a carbon material having a noble metal catalyst supported thereon at high temperature, lifetime of a fuel cell can be extended.

As other effects that can be generated by heat treatment at high temperature, prevention of deformation of an electrode layer structure may be included. On the surface of a carbon material subjected to heat treatment at high temperature, fine concavity and convexity are formed, by which adsorption characteristics of an ion conductive polymer contained in an electrode catalyst layer can be enhanced. By such enhancement, deformation of an electrode structure caused by deterioration by decomposition of the ion conductive polymer can be reduced, and reduction of gas diffusivity or drainage of generating water can be suppressed. As a result, increase in concentration over-voltage can be reduced.

In the present invention, inert gas in this case is not especially limited, and helium (He), neon (Ne), argon (Ar), krypton (Kr), xenon (Xe), and nitrogen ($N_2$) or the like may be used. The above inert gas may be used alone or in a mixed gas of 2 or more members.

In the present invention, heat treatment conditions are not especially limited as long as the above effect can be attained. For example, heat treatment temperature is 300 to 1200° C., more preferably 400 to 1150° C. In this case, the heat treatment temperature below 300° C. would provide difficulty in increase of particle diameter to a desired size, due to no occurrence of growth (sintering) of particle diameter of platinum and a platinum alloy. On the other hand, the heat treatment temperature over 1200° C. would make particle diameter too large as compared with a desired size, due to excess growth (sintering) of particle diameter of platinum and a platinum alloy. In addition, heat treatment time is not especially limited, and may be selected as appropriate depending on heat treatment temperature or the like. It is preferably 10 to 600 minutes, and more preferably 30 to 300 minutes.

In addition, in the present invention, a carbon material having a noble metal catalyst supported thereon is preferably subjected to heat treatment under atmosphere of mixed gas of reducing gas and inert gas. In this way, by supporting a noble metal catalyst on a carbon material and then subjecting the resultant catalyst-supporting carbon to heat treatment under atmosphere of mixed gas of reducing gas and inert gas, a hydroxyl group or an organic functional group formed on the surface of the carbon material can be eliminated, and at the same time, the amorphous moiety of the carbon material can further be reduced by reduction like methanation reaction ($C+2H_2 \rightarrow CH_4$). In addition, there is also advantage that sintering of catalyst particles is easily occurred under atmosphere containing reducing gas (hydrogen) in inert gas.

In the present invention, in the case where a carbon material having a noble metal catalyst supported thereon is subjected to heat treatment under atmosphere of mixed gas of reducing gas and inert gas, the reducing gas is not especially limited. Hydrogen ($H_2$) gas is preferably used. This is because it is estimated that heat treatment under atmosphere of inert gas containing hydrogen gas as reducing gas can reduce a functional group on the surface of a carbon material by the presence of hydrogen in the atmosphere, and reduce the amorphous moiety of the carbon material by methanation reaction ($C+2H_2 \rightarrow CH_4$) or the like, to effectively eliminate the functional group or amorphous moiety. However, it should be noted that it is only estimation of mechanism, and the present invention should not be limited to embodiments of enhancing corrosion resistance by such mechanism.

In the case where a carbon material having a noble metal catalyst supported thereon is subjected to heat treatment under atmosphere of mixed gas of reducing gas and inert gas, concentration of the reducing gas contained in the inert gas is not especially limited as long as a functional group on the surface of the carbon material or the amorphous moiety of the carbon material can be eliminated. In view of safety, it is preferably equal to or lower than 50% by volume, and more preferably equal to or lower than 20% by volume, relative to the inert gas. In this case, although lower limit of the concentration of the reducing gas is not especially limited, it is usually set to be 1% by volume, on the ground that too low concentration of the reducing gas, in particular hydrogen gas, would insufficiently eliminate moiety liable to corrode.

In the case where a carbon material having a noble metal catalyst supported thereon is subjected to heat treatment under atmosphere of mixed gas of reducing gas and inert gas, heat treatment conditions are not especially limited as long as the above effects can be attained. For example, heat treatment temperature is 300 to 1200° C., more preferably 400 to 1150° C. The heat treatment temperature within such a range can provide sufficient growth of particle diameter of a noble metal catalyst without promoting reductive disappearance of a carbon material. The too low heat treatment temperature would provide insufficient growth of particle diameter of a noble metal catalyst. The too high heat treatment temperature would induce activity reduction at the initial stage, due to promotion of reductive disappearance of a carbon material, as well as thermal sintering of particles of a noble metal catalyst. In addition, heat treatment time is not especially limited, and may be selected as appropriate depending on heat treatment temperature or the like. It may be preferably 10 to 600 minutes, and more preferably 30 to 300 minutes.

In particular, in the co-presence of hydrogen gas, it is estimated that a temperature range at which methanation reaction of carbon occurs is from 600° C. to 900° C. Therefore, in the case of heat treatment under atmosphere of mixed gas of reducing gas and inert gas, the above temperature range may be preferably excluded. Specifically, the heat treatment is particularly preferably executed at 300° C. to 600° C., more preferably at 400° C. to 600° C.; or at 900° C. to 1200° C., more preferably at 900° C. to 1150° C. and further more preferably at 900° C. to 1100° C. In particular, the heat treatment temperature at 400° C. to 600° C. is preferable, because within such a range, elution of a catalyst metal can effectively be suppressed by growth of catalyst particles. In addition, the heat treatment temperature at 900° C. to 1100° C. is also preferable, because within such a range, elution of a catalyst metal can be effectively suppressed by growth of catalyst particles, and at the same time, corrosion of a carbon material having a noble metal catalyst supported thereon can be suppressed. In addition, heat treatment time is not especially limited, and may be selected as appropriate depending on heat treatment temperature or the like. It is preferably 10 to 600 minutes, and more preferably 30 to 300 minutes.

In the present invention, a carbon material having a noble metal catalyst supported thereon may be also preferably subjected to heat treatment under atmosphere of mixed gas of oxidizing gas and inert gas. It is because it may be estimated that by supporting a noble metal catalyst on a carbon material and then subjecting the resultant catalyst-supporting carbon to heat treatment under atmosphere of mixed gas of oxidizing gas and inert gas, a hydroxyl group or a functional group on the surface of the carbon material can be eliminated by oxidation with oxygen in the atmosphere, and the amorphous moiety of the carbon material can be further reduced by oxidation reaction ($C+O_2 \rightarrow CO_2$). In addition, it may also be estimated that, by supporting a noble metal catalyst on a carbon material and then subjecting the resultant carbon to heat treatment under atmosphere of inert gas, particularly under atmosphere of mixed gas of reducing gas or oxidizing gas and inert gas, a surface state of a carbon material can be stabilized and corrosion of a carbon material can be suppressed. However, it is only estimation of mechanism, and the present invention should not be limited to embodiments of enhancing corrosion resistance by such mechanism.

In the present invention, in the case where a carbon material having a noble metal catalyst supported thereon is subjected to heat treatment under atmosphere of mixed gas of oxidizing gas and inert gas, the oxidizing gas is not especially limited. Oxygen ($O_2$) gas is preferably used.

In the case where a carbon material having a noble metal catalyst supported thereon is subjected to heat treatment under atmosphere of mixed gas of oxidizing gas and inert gas, concentration of the oxidizing gas contained in the inert gas is not especially limited as long as a functional group on the surface of the carbon material or the amorphous moiety of the carbon material can be eliminated. However, under atmosphere of inert gas containing oxidizing gas, combustion of an electrode catalyst would easily occur. Therefore, the concentration of oxygen is necessary to be lowered to certain degree. Specifically, in view of easy combustion of an electrode catalyst, it is preferably equal to or lower than 5% by volume, more preferably equal to or lower tan 0.5% by volume, and further preferably equal to or lower tan 0.05% by volume, relative to the inert gas. It may be estimated that in the case of heat treatment under such low oxygen atmosphere, a functional group would be eliminated by oxidation with the oxygen in the atmosphere. However, it is only estimation of mechanism, and the present invention should not be limited to embodiments of enhancing corrosion resistance by such mechanism. In this case, lower limit of concentration of the oxidizing gas is not especially limited. The upper limit value of concentration of the oxidizing gas may be usually 5% by volume and more preferably 0.5% by volume, because too high concentration of the oxidizing gas, on particular, oxygen gas, would eliminate a moiety other than the moiety liable to corrode.

In the case where a carbon material having a noble metal catalyst supported thereon is subjected to heat treatment under atmosphere of mixed gas of oxidizing gas and inert gas, heat treatment conditions are not especially limited as long as the above effects can be attained. For example, heat treatment temperature may be 300 to 1200° C., more preferably 300 to 600° C. The heat treatment temperature within such a range can provide sufficient growth of particle diameter of noble metal catalyst particles without promoting reductive disappearance of a carbon material. The too low heat treatment temperature would provide insufficient growth of particle diameter of a noble metal catalyst. The too high heat treatment temperature would induce activity reduction at the initial stage, due to promotion of disappearance of a carbon material, as well as thermal sintering of particles of a noble metal catalyst. In addition, heat treatment time is not especially limited, and may be selected as appropriate depending on heat treatment temperature or the like. It may be preferably 10 to 600 minutes, and more preferably 30 to 300 minutes.

As described above, heat treatment of the present invention can increase particle diameter by growing by sintering of small catalyst particles while maintaining a highly dispersed state of catalyst particles. Accordingly, average particle diameter of the noble metal particles after heat treatment of the present invention may be preferably from 3 to 8 mm, and more preferably from 3 to 6 mm. It may be estimated that noble metal catalyst particles with smaller average particle diameter, because of larger specific surface, can provide increased electrochemical surface area and also enhanced catalytic activity. In practice, however, even by extremely decreasing catalyst particle diameter, catalytic activity comparable to increased amount of specific surface area could not be obtained. Therefore, it is preferable to set the average particle diameter within the above range. Average particle diameter within the above range can suppress elution of a metal at the initial stage of service of a fuel cell, and reduce degradation with time of a fuel cell. In addition, because grown particles have reduced and stabilized surface energy of particles themselves, elution of a catalyst metal at the initial stage of service of a fuel cell can be reduced, and degradation with time of a fuel cell can be also suppressed. In this case, a method for measuring average particle diameter of noble metal catalyst particles may include a method which comprises measuring particle diameters of particles observed in several to several tens visual fields, for a representative sample, using a scanning electron microscope, and calculating average value based on the measured particle diameters. It should be noted that although this measurement method generates significant difference in average particle diameter depending on a sample observed or visual field, it is shown as average value as in Examples.

As described above, by heat treatment according to the present invention, an electrode catalyst excellent in corrosion resistance can be obtained. Therefore, a third aspect of the present invention relates to a membrane-electrode assembly (MEA) which comprises an electrolyte membrane, an anode catalyst layer and a cathode catalyst layer, characterized in that the anode catalyst layer and/or cathode catalyst layer contains an electrode catalyst of the present invention, or an electrode catalyst produced by a method of the present invention. In the above aspect, an electrode catalyst may be used in a cathode catalyst layer, in an anode catalyst layer, or in both of a cathode catalyst layer and an anode catalyst layer. In consideration that carbon corrosion easily occurs particularly at the cathode catalyst layer side, it is preferably used at least in a cathode catalyst layer. In addition, it is more preferably used in both of a cathode catalyst layer and an anode catalyst layer. In this case, it is particularly preferable that an electrode catalyst of the present invention is used in a larger amount at the cathode catalyst layer side. In this case, a cathode catalyst is a material fulfilling a role to promote reaction at the cathode side, while an anode catalyst is a material fulfilling a role to promote reaction at the anode side.

The third aspect of the present invention features in an electrode catalyst, and a known material or a known method in the art can be similarly applied except that an electrode catalyst of the present invention is used in MEA or a fuel cell. Therefore, MEA of the present invention may be produced by a transcription method or a direct coating method using an electrode catalyst according to the present invention. In addition, MEA according to the present invention may further have, in general, a gas diffusion layer. In this case, a method which comprises sandwiching MEA between gas diffusion layers, or forming a catalyst layer in advance on the surface of the gas diffusion layer, to produce a catalyst layer-gas diffusion layer assembly, and then sandwiching and joining an electrolyte membrane by the resultant catalyst layer-gas diffusion layer assembly or the like by hot press may be preferably used.

In the above aspect, amount of a noble metal catalyst to be supported in an electrode catalyst having the noble metal catalyst support onto a carbon material, is not especially limited, and may be suitably selected so that desired power generation characteristics can be obtained, depending on kind of a catalyst, performance of a fuel cell, kind of a carbon material, or the like. For example, in the case where carbon black is used as a carbon material, amount of platinum and a platinum alloy to be supported in a cathode catalyst layer is preferably 30 to 70% by mass, and more preferably 40 to 60% by mass, relative to mass of carbon black contained in the cathode catalyst layer. Further, amount of platinum and a platinum alloy to be supported in an anode catalyst layer is preferably 5 to 60% by mass, and more preferably 20 to 50% by mass, relative to mass of carbon black contained in the anode catalyst layer. In this case, the amounts within this range can provide a high dispersion of the noble metal catalyst on the carbon material, and excellent power generation performance can be expected. It should be noted that the amount of the noble metal catalyst can be checked by inductively-coupled plasma emission spectroscopy (ICP).

In the present invention, by making average thickness (Ya) of an anode catalyst layer smaller than average thickness (Yc) of a cathode catalyst layer, for example, durability of the cathode catalyst layer against start-stop operation of proton-exchange membrane fuel cell can be enhanced. Therefore, in the present invention, average thickness (Ya) of the anode catalyst layer is preferably smaller than average thickness (Yc) of the cathode catalyst layer. By this design, hydrogen remaining at the anode side in stopping operation may be efficiently purged with other gas. As a result, formation of a local cell at the anode side in starting operation can be suppressed, and deterioration of the proton-exchange membrane fuel cell (PEFC) can be prevented. In addition, when the anode catalyst layer is thin, water content of the anode catalyst layer would tend to be lowered upon purging with gas such as air and the like to replace hydrogen at the anode side in stopping operation. Namely, the anode catalyst layer may tend to be dried easily. Consequently, for compensation of water content lowered at the anode catalyst layer, water migration would occur from a solid polyelectrolyte membrane having relatively high water content. At the same time, water migration would occur from the cathode catalyst layer to the solid polyelectrolyte membrane, which would induce decrease in water content of the cathode catalyst layer. Oxygen does not generate in the absence of water at the vicinity of a platinum catalyst, even when the cathode catalyst layer is exposed to high voltage in starting operation. Therefore, carbon corrosion in start-stop operation can be suppressed. However, the mechanism on composition and the effect of the present invention is only estimation, and technical scope of the present invention should not be limited to embodiments utilizing the mechanism.

As described above, average thickness (Ya) of the anode catalyst layer is preferably smaller than average thickness (Yc) of the cathode catalyst layer. In this case, relation between Ya and Yc is not especially limited as long as satisfying Ya<Yc. In the present invention, particularly in application of PEFC, Ya and Yc preferably satisfy relation of Ya/Yc=0.01 to 0.9, more preferably Ya/Yc=0.02 to 0.8. By controlling thicknesses of the catalyst layers so as to satisfy this relation, PEFC having excellent durability can be obtained.

In the present invention, average thickness (Ya) of the anode catalyst layer preferably is 0.3 to 8 μm, and more preferably 1 to 7 μm. In addition, average thickness (Yc) of the cathode catalyst layer preferably is 6 to 20 μm, and more preferably 7 to 18 μm. Within these ranges, carbon corrosion or platinum elution in start-stop operation or in load variation can effectively be suppressed. A thinner catalyst layer can provide more excellent gas diffusivity and permeability, along with drainage of humidified water and generated water. Since a too thin catalyst layer would make maintaining of durability difficult, preferable thickness may be determined by taking the balance into consideration. It should be noted that average thickness (Ya) of the anode catalyst layer and average thickness (Yc) of the cathode catalyst layer are particularly preferable to satisfy the above ratio, Ya/Yc, at the same time.

Instead of or in addition to the above, in the present invention, by making content (Ma) of platinum and a platinum alloy in the anode catalyst layer less than content (Mc) of platinum and a platinum alloy in the cathode catalyst layer, durability of a cathode catalyst layer against start-stop operation of proton-exchange membrane fuel cell can be enhanced. Therefore, in the present invention, content (Ma) of platinum and a platinum alloy in the anode catalyst layer is preferably set so as to be less than content (Mc) of platinum and a platinum alloy in the cathode catalyst layer. By this setting, amount of hydrogen peroxide formed by reaction between oxygen reached the anode side by cross-leaking through an electrolyte membrane from the cathode side, and hydrogen supplied to the anode side can be reduced. As a result, it can be suppressed that hydrogen peroxide formed at the anode side reaches the cathode side by cross-leaking through the electrolyte membrane, to generate radicals in the cathode catalyst layer, and decompose the electrolyte membrane or an ionomer. However, the mechanism on composition and the effect of the present invention is only estimation, and technical scope of the present invention should not be limited to embodiments utilizing the mechanism.

As mentioned above, content (Ma) of platinum and a platinum alloy in the anode catalyst layer is preferably set so as to be less than content (Mc) of platinum and a platinum alloy in the cathode catalyst layer. Although relation between Ma and Mc is not especially limited as long as satisfying Ma<Mc, in the present invention, particularly in application of PEFC, Ma and Mc preferably satisfy such relation as Ma/Mc=0.01 to 0.9, and more preferably Ma/Mc=0.03 to 0.8. By controlling contents of platinum and a platinum alloy in the catalyst layers within such relation, PEFC having excellent durability can be obtained.

In the present invention, content (Ma) of platinum and a platinum alloy in the anode catalyst layer is preferably 0.005 to 0.35 mg/cm$^2$, and more preferably 0.01 to 0.30 mg/cm$^2$. Content (Mc) of platinum and a platinum alloy in the cathode catalyst layer is preferably 0.15 to 0.6 mg/cm$^2$, and more preferably 0.18 to 0.50 mg/cm$^2$. Within these ranges, carbon corrosion or platinum elution in start-stop operation or in load variation can be effectively suppressed. Although smaller content of platinum and a platinum alloy in the anode catalyst layer can reduce amount of formed hydrogen peroxide, too low content of platinum and a platinum alloy in the anode catalyst layer would make difficult to maintain oxidation activity of hydrogen or durability at an anode. Accordingly, contents of platinum and a platinum alloy may be determined by taking good balance into consideration. It should be noted that content (Ma) of platinum and a platinum alloy in the anode catalyst layer, and content (Mc) of platinum and a platinum alloy in the cathode catalyst layer are particularly preferable to satisfy the above ratio, Ma/Mc, at the same time.

In addition, by heat treatment at high temperature, fine concavity and convexity can be formed on the surface of a carbon material. By such formation, adsorption characteristics of an ion conductive polymer contained in a catalyst layer of a fuel cell can be enhanced. By such enhancement, deformation of an electrode structure caused by deterioration by decomposition of the ion conductive polymer can be reduced, and reduction of gas diffusivity or drainage of generating water can be suppressed. As a result, increase in concentration over-voltage can be reduced. Therefore, a fourth aspect of the present invention relates to a proton-exchange membrane fuel cell (PEFC) having a membrane-electrode assembly of the present invention.

An electrode catalyst used in PEFC is not especially limited, and may includes platinum and a platinum alloy. As the platinum alloy, a platinum alloy containing platinum (Pt), and at least one member selected among iridium (Ir), rhodium (Rh), indium (In), palladium (Pd), silver (Ag) and gold (Au) or the like can be cited. Further, the platinum alloy preferably has composition represented by the formula: $Pt_aX_b$ (wherein X represents at least one element selected from the group consisting of Ir, Rh, In, Pd, Ag and Au; a is 0.7 to 1.0; and b is 0 to 0.3).

An electrode catalyst of the present invention, or an electrode catalyst produced by a production method of the present invention has excellent corrosion resistance, and can largely contribute to enhancement of durability of a fuel cell, as described above. PEFC may be included in explanation below as a suitable application of an electrode catalyst. In PEFC, an electrode catalyst is arranged in a catalyst layer. As a general configuration of PEFC, a separator, a gas diffusion layer, a cathode catalyst layer, a polyelectrolyte membrane, an anode catalyst layer, a gas diffusion layer, and a separator may be arranged in this order. However, the present invention should not be limited to such a fundamental configuration, and the present invention can also be applied to PEFC having other configuration.

For example, to prevent flooding in PEFC, a mill layer may be arranged between a gas diffusion layer, and a cathode catalyst layer or an anode catalyst layer. The mill layer is referred to as a mixture layer composed of carbon and a water repellent fluorocarbon resin such polytetrafluoroethylene or the like, and formed on the surface of a gas diffusion layer.

PEFC of the present invention has a catalyst layer hardly to be deteriorated, and thus is excellent in durability. Namely, PEFC of the present invention shows small voltage reduction even after service over a long period of time. Such characteristics are particularly useful in an application requiring for durability over a long period of time. Such an application may include a vehicle. Because PEFC of the present invention can maintain power generation characteristics over a long period of time, extension of lifetime of a vehicle mounted with PEFC of the present invention, or enhancement of vehicle value can be attained.

Kind of the fuel cell is not especially limited, and the above explanation has been made with reference to proton-exchange membrane fuel cell (PEFC) as an example. In addition to this, an alkali type fuel cell, a fuel cell of an acid electrolyte represented by phosphoric acid type fuel cell, a direct methanol type fuel cell, a micro fuel cell or the like may be also included. Among these, PEFC is preferably included due to enabling compact sizing, high density, and high output power. In addition, the fuel cell is useful also as a stationary power source, as well as a power source for a movable body such as an automobile or the like, where mounting space is limited, particularly, can be suitably used in an automobile application where particularly start-stop operation or output power variation of a system frequently occurs.

The PEFC is useful as a power source for a movable body such as an automobile or the like, where mounting space is limited, as well as a stationary power source. Among others, it is particularly preferable to be used as a power source for a movable body such as an automobile or the like where carbon corrosion is easily occurred due to demand of high output voltage after operation stop for a relatively long period of time, and deterioration of polyelectrolyte is also easily generated by taking out high output voltage during operation.

EXAMPLES

The present invention will be described in more specifically below with reference to Examples, however, the present invention should not be limited to the following Examples.

Example 1

1. Preparation of Anode Catalyst Layer

First, 4.0 g of carbon black (Ketjenblack™ EC produced by Ketjen Black International Co., Ltd.; BET surface area=800 m$^2$/g) was prepared, and 400 g of an aqueous solution of dinitrodiamine platinum (Pt concentration of 1.0%) was added thereto and stirred for 1 hr. Then, 50 g of methanol was added as a reducing agent and stirred for 1 hr. Subsequently, the solution was warmed to 80° C. over 30 minutes, followed by stirring at 80° C. for 6 hrs and cooling to room temperature over 1 hr. The precipitate was filtered, and then the resultant solid was dried at 85° C. for 12 hours under reduced pressure, and crushed in a mortar, to yield a carbon carrier having Pt particles with an average particle diameter of 2.6 nm supported thereon with Pt supporting concentration of 48% by mass.

In this case, average particle diameter of the platinum catalyst was determined by measuring particle diameters of particles observed in several to several tens visual fields for a representative sample with a scanning electron microscope, and calculating average of the determined particle diameters.

Then, purified water of 5 times mass, relative to mass of the resultant carbon carrier having Pt particles supported thereon, was added to the carbon carrier, and subjected to defoaming operation under reduced pressure for 5 minutes. To this solution, 0.5 time mass of n-propyl alcohol and 5 times mass of propylene glycol were added, and a solution containing 20 wt. % of Nafion™ (produced by DuPont Co., Ltd.) as an electrolyte, was further added. The electrolyte in the solution was used at mass ratio of solid content relative to mass of the carbon carrier (carbon/ionomer (electrolyte)) of 1.0/0.9.

The resultant mixed slurry was dispersed by a homogenizer and subjected to defoaming operation under reduced pressure, to yield a catalyst slurry. The resultant catalyst slurry was printed by a screen-printing method in an amount so as to give a desired thickness on one surface of a polytetrafluoroethylene sheet, and then dried at 60° C. for 24 hours. Size of the anode catalyst layer produced by the screen-printing method was set to be 5 cm×5 cm. In addition, the coating layer on the polytetrafluoroethylene sheet was adjusted so as to give Pt amount of 0.1 mg/cm$^2$.

2. Preparation of Cathode Catalyst Layer

To 4.0 g of carbon black (Ketjenblack™ EC produced by Ketjen Black International Co., Ltd.), 400 g of an aqueous solution of dinitrodiamine platinum (Pt concentration of 1.0%) was added and stirred for 1 hr. Further, 50 g of methanol was added as a reducing agent and stirred for 1 hr. Subsequently, the solution was warmed to 80° C. over 30 minutes, followed by stirring at 80° C. for 6 hrs and cooling to room temperature over 1 hr. The precipitate was filtered, and then the resultant solid substance was dried at 85° C. for 12 hours under reduced pressure, and crushed in a mortar, to yield a carbon carrier having Pt particles with an average particle diameter of 2.6 nm supported thereon with Pt supporting concentration of 48% by mass.

The resultant electrode catalyst was subjected to heat treatment at 100° C. for 30 minutes under flow of argon gas containing hydrogen in an amount of 5% by volume. Intensity ratio before and after the heat treatment, determined by Raman spectrum, changed from 2.05 to 1.87, confirming progress of graphitization. A carbon carrier was obtained, on which platinum was supported in a concentration of 50% by mass before and after the heat treatment. Average particle diameter of platinum catalyst increased from 2.6 nm to 3.9 nm, confirming progress of growth of particle diameter.

Then, purified water of 5 times mass, relative to mass of the resultant carbon carrier having Pt particles supported thereon, was added to the carbon carrier, and subjected to defoaming operation under reduced pressure for 5 minutes. To this solution, 0.5 time mass of n-propyl alcohol and 5 times mass of propylene glycol were added, and a solution containing 20 wt. % of Nafion™ (produced by DuPont Co., Ltd.) as an electrolyte, was further added. The electrolyte in the solution was used at mass ratio of solid content relative to mass of the carbon carrier (carbobn/ionomer (electrolyte)) of 1.0/0.9.

The resultant mixed slurry was dispersed by a homogenizer and subjected to defoaming operation under reduced pressure, to yield a catalyst slurry. The resultant catalyst slurry was printed by a screen-printing method in an amount so as to give a desired thickness on one surface of a polytetrafluoroethylene sheet, and then dried at 60° C. for 24 hours. Size of the anode catalyst layer produced by the screen-printing method was set to be 5 cm×5 cm. In addition, the coating layer on the polytetrafluoroethylene sheet was adjusted so as to give Pt amount of 0.4 mg/cm$^2$.

3. Preparation of Membrane-Electrode Assembly

Nafion™ NR-111 (membrane thickness of 25 μm), as a solid polyelectrolyte membrane, was superposed the anode catalyst layer, which had been formed on the polytetrafluoroethylene sheet, and the cathode catalyst layer, which had been formed on the polytetrafluoroethylene sheet, was further superposed thereon, to obtain a laminate. Subsequently, the laminate was hot-pressed at 130° C. for 10 minutes under 2.0 MPa, and the polytetrafluoroethylene sheet was peeled off, to yield a membrane-electrode assembly.

The cathode catalyst layer transcribed on the solid polyelectrolyte membrane had a thickness of about 14 μm, a Pt supporting amount of 0.4 mg per apparent electrode area of 1 cm$^2$, and an electrode area of 25 cm$^2$. The anode catalyst layer had a thickness of about 4 μm, a Pt supporting amount of 0.2 mg per apparent electrode area of 1 cm$^2$, and an electrode area of 25 cm$^2$.

Performance of the resultant membrane-electrode assembly was evaluated as follows.

At each the sides of the membrane-electrode assembly, a carbon paper (size of 6.0 cm×5.5 cm, and thickness of 320 μm) as a gas diffusion layer, and a gas separator provided with a gas flow channel were arranged. Then, it was sandwiched between collectors made of gold-plated stainless steel, to prepare a unit cell for evaluation.

4. Evaluation Methods for Performance and Durability

To the anode side of the unit cell for evaluation was supplied hydrogen gas as fuel, and to the cathode side thereof was supplied air as an oxidizing agent. Supplying pressures of both gases, hydrogen gas and air, were set to atmospheric pressure, and hydrogen was set to have a temperature of 58.6° C. and a relative humidity of 60%, and air was set to have a temperature 54.8° C. and a relative humidity of 50%, and cell temperature was set at 70° C. In addition, utilization rate of hydrogen was set to be 67%, and utilization rate of air was set to be 40%.

Under these conditions, cell voltage was measured upon power generation at a current density of 1.0 A/cm$^2$, to obtain an initial stage cell voltage.

Subsequently, after 60 seconds of power generation, power generation was stopped. After the stopping, hydrogen gas and air were stopped to be supplied. Air was supplied to the anode side at a rate of 0.1 L/min to purge hydrogen and then held for 50 seconds. Then, hydrogen gas was supplied to the anode side at a rate of 0.05 L/min for 10 seconds, and then the anode side was supplied with hydrogen gas and the cathode side was supplied with air, under the same conditions as in the above. Then, power generation was re-started for 60 seconds at a current density of 1.0 A/cm$^2$. In this case, load current at this time was increased from 0 A/cm$^2$ to 1.0 A/cm$^2$ over 30 seconds. After executing this power generation-stop operations, cell voltage was measured to evaluate power generation performance. Specifically, cycle number till cell voltage reached 0.45 V at a current density of 1.0 A/cm$^2$ was used as evaluation value of durability.

Conditions of preparing an anode catalyst layer and a cathode catalyst layer of the present Example, along with the above results are shown in Table 1 and Table 2.

Example 2

4 g of carbon black (Ketjenblack™ EC produced by Ketjen Black International Co., Ltd.; BET surface area=800 m$^2$/g) was prepared, and 400 g of an aqueous solution of dinitrodiamine platinum (Pt concentration of 0.9%) and an aqueous solution of iridium chloride (Ir concentration of 0.10%) were added thereto and stirred for 1 hr. Then, 50 g of methanol was added as a reducing agent and stirred for 1 hr. Subsequently, the solution was warmed to 80° C. over 30 minutes, followed by stirring at 80° C. for 6 hrs and cooling to room temperature over 1 hr. The precipitate was filtered, and then the resultant solid was dried at 85° C. for 12 hours under reduced pressure, and crushed in a mortar, to yield a carbon carrier having Pt particles with an average particle diameter of 2.8 nm supported thereon with Pt supporting concentration of 51% by mass.

The resultant electrode catalyst was subjected to heat treatment at 100° C. for 30 minutes under flow of argon gas containing hydrogen in an amount of 5% by volume. Intensity ratio before and after the heat treatment, determined by Raman spectrum, changed from 2.05 to 1.87, confirming progress of graphitization. A carbon carrier was obtained, on which platinum was supported in a concentration of 51% by mass before and after the heat treatment. Average particle diameter of platinum catalyst increased from 2.8 nm to 4.6 nm, confirming progress of growth of particle diameter.

Similarly as in Example 1, the coating layer on the polytetrafluoroethylene sheet was adjusted so as to give Pt amount of 0.4 mg/cm$^2$.

A solid polyelectrolyte membrane was superposed on the anode catalyst layer of the Example 1, and the cathode catalyst layer, which had been formed on the polytetrafluoroethylene sheet, was further superposed thereon, to obtain a laminate. Subsequently, the laminate was hot-pressed, and the polytetrafluoroethylene sheet was peeled off, to yield a membrane-electrode assembly.

The cathode catalyst layer transcribed on the solid polyelectrolyte membrane had a thickness of about 14 μm, a Pt supporting amount of 0.4 mg per apparent electrode area of 1 cm$^2$, and an electrode area of 25 cm$^2$. The anode catalyst layer had a thickness of about 4 μm, a Pt supporting amount of 0.2 mg per apparent electrode area of 1 cm$^2$, and an electrode area of 25 cm$^2$.

Conditions of preparing an anode catalyst layer and a cathode catalyst layer of the present Example, along with the above results are shown in Table 1 and Table 2.

Examples 3 to 17

An MEA was prepared similarly as in Example 1, except that configuration of a fuel cell was changed as shown in Table 1 and Table 2, and performance and durability were evaluated. The configuration and results are shown in Table 1 and Table 2.

Comparative Example 1

To 4.0 g of carbon black (Ketjenblack™ EC produced by Ketjen Black International Co., Ltd.), 400 g of an aqueous solution of dinitrodiamine platinum (Pt concentration of 1.0%) was added and stirred for 1 hr. Further, 50 g of formic acid was added as a reducing agent and stirred for 1 hr. Subsequently, the solution was warmed to 40° C. over 30 minutes, followed by stirring at 40° C. for 6 hrs. Then, the solution was warmed to 60° C. over 30 minutes and further stirred at 60° C. for 6 hours, and then cooled to room temperature over 1 hr. The precipitate was filtered, and then the resultant solid substance was dried at 85° C. for 12 hours under reduced pressure, and crushed in a mortar, to yield a cathode catalyst. Average particle diameter of the resultant platinum catalyst was 2.6 nm.

An MEA was prepared similarly as in Example 1, except that configuration of a fuel cell was changed as shown in Table 1 and Table 2, and performance and durability were evaluated. The configuration and results are shown in Table 1 and Table 2.

Comparative Example 2

A cathode catalyst was prepared similarly as in Comparative Example 1, except that carbon black (Vulcan XC-72, produced by Cabot Co., Ltd.,) was used as a carbon material. Average particle diameter of the resultant platinum catalyst was 3.2 nm.

An MEA was prepared similarly as in Example 1, except that configuration of a fuel cell was changed as shown in Table 1, and performance and durability were evaluated. The configuration and results are shown in Table 1 and Table 2.

Example 18

To 4.0 g of carbon black (Ketjenblack™ EC produced by Ketjen Black International Co., Ltd.), 400 g of an aqueous solution of dinitrodiamine platinum (Pt concentration of 1.0%) was added and stirred for 1 hr. Further, 50 g of formic acid was added as a reducing agent and stirred for 1 hr. Subsequently, the solution was warmed to 40° C. over 30 minutes, followed by stirring at 40° C. for 6 hrs. Then, the solution was warmed to 60° C. over 30 minutes and further stirred at 60° C. for 6 hours, and then cooled to room temperature over 1 hr. The precipitate was filtered, and then the resultant solid substance was dried at 85° C. for 12 hours under reduced pressure, and crushed in a mortar, to yield an electrode catalyst. The resultant electrode catalyst was subjected to heat treatment at 1000° C. for 4 hours under flow of argon gas. Average particle diameter of a platinum catalyst after heat treatment was 3.8 nm.

In this case, average particle diameter of the platinum catalyst was determined by measuring particle diameters of 300 particles observed in ten visual fields with a scanning electron microscope, and calculating average and deviation of the determined particle diameters.

Example 19

An electrode catalyst was produced similarly as in Example 18, except that carbon black (Vulcan™ XC-72, produced by Cabot Co., Ltd.,) was used as a carbon material. The resultant electrode catalyst was subjected to heat treatment at 1000° C. for 4 hours under flow of argon gas. Average particle diameter of the resultant platinum catalyst was 4.7 nm.

Example 20

An electrode catalyst was produced similarly as in Example 18, except that acetylene black (acetylene black, produced by Denki Kagaku Kogyo Kabushiki Kaisha) was used as a carbon material. The resultant electrode catalyst was subjected to heat treatment at 1000° C. for 4 hours under flow of argon gas. Average particle diameter of the resultant platinum catalyst was 5.6 nm.

Example 21

An electrode catalyst was produced similarly as in Example 18, except that graphitized carbon black (Ketjenblack™ EC produced by Ketjen Black International Co., Ltd.) was used as a carbon material. The resultant electrode catalyst was subjected to heat treatment at 1000° C. for 4 hours under flow of argon gas. Average particle diameter of the resultant platinum catalyst was 4.9 nm.

Example 22

An electrode catalyst was produced similarly as in Example 18, except that graphitized carbon black (Black Pearl™ produced by Cabot Co., Ltd.) was used as a carbon material. The resultant electrode catalyst was subjected to heat treatment at 1000° C. for 4 hours under flow of argon gas. Average particle diameter of the resultant platinum catalyst was 4.4 nm.

Comparative Example 3

To 4.0 g of carbon black (Ketjenblack™ EC produced by Ketjen Black International Co., Ltd.), 400 g of an aqueous solution of dinitrodiamine platinum (Pt concentration of 1.0%) was added and stirred for 1 hr. Further, 50 g of formic acid was added as a reducing agent and stirred for 1 hr. Subsequently, the solution was warmed to 40° C. over 30 minutes, followed by stirring at 40° C. for 6 hrs. The solution was warmed to 60° C. over 30 minutes and further stirred at 60° C. for 6 hours, and then cooled to room temperature over 1 hr. The precipitate was filtered, and then the resultant solid substance was dried at 85° C. for 12 hours under reduced pressure, and crushed in a mortar, to yield an electrode catalyst. Average particle diameter of the platinum catalyst was 2.8 nm.

Comparative Example 4

An electrode catalyst was produced similarly as in Comparative Example 3, except that carbon black (Vulcan TXC-72, produced by Cabot Co., Ltd.,) was used as a carbon material. Average particle diameter of the resultant platinum catalyst was 3.2 nm.

Conditions of preparing an anode and cathode catalyst layers of Examples 18 to 22, and Comparative examples 3 and 4, along with the results are shown in Table 1 and Table 2.

(Evaluation of Initial Power Generation Performance and Durability)

Purified water of 5 times mass, relative to mass of the electrode catalyst, was added to the electrode catalyst, and subjected to defoaming operation under reduced pressure for 5 minutes. To this solution, 0.5 time mass of n-propyl alcohol was added, and a solution containing a proton conductive polyelectrolyte (containing 20% by mass of Nafion™, produced by DuPont Co., Ltd.) was further added. The electrolyte in the solution was used at mass ratio of solid content relative to mass of the carbon carrier (carbobn/ionomer (electrolyte)) of 1.0/0.9.

The resultant mixed slurry was sufficiently dispersed by a homogenizer and subjected to defoaming operation under reduced pressure, to yield a catalyst slurry. The resultant catalyst slurry was printed by a screen-printing method in an amount so as to give a desired thickness on one surface of a polytetrafluoroethylene sheet, and then dried at 60° C. for 24 hours. Size of the cathode catalyst layer formed was set to be 5 cm×5 cm. In addition, the coating layer on the polytetrafluoroethylene sheet was adjusted so as to give Pt amount of 0.4 mg/cm$^2$.

PEFC for evaluation was prepared using this cathode catalyst layer. In this case, Nafion™ 111 (membrane thickness of 25 μm), as a solid polyelectrolyte membrane, was used. The cathode catalyst layer was set to have a thickness of about 10 μm and an electrode surface of 25 cm$^2$. The anode catalyst layer was set to have a thickness of about 2 μm and an electrode surface of 25 cm$^2$. A gas diffusion layer and a separator were arranged at the outside of the cathode catalyst layer, the solid polyelectrolyte membrane and the anode catalyst layer, and the resultant laminate was sandwiched between collectors made of gold-plated stainless steel, to prepare a unit cell for evaluation. To the anode side of the unit cell for evaluation was supplied hydrogen gas as fuel, and to the cathode side thereof was supplied air as an oxidizing agent. Supplying pressures of both gases, hydrogen gas and air, were set to atmospheric pressure, and hydrogen was set to have a temperature of 58.6° C. and a relative humidity of 60%, and air was set to have a temperature 54.8° C. and a relative humidity of 50%, and cell temperature was set at 70° C. In addition, utilization rate of hydrogen was set to be 67%, and utilization rate of air was set to be 40%. Under these conditions, cell voltage was measured upon power generation at a current density of 1.0 A/cm$^2$, to obtain an initial stage cell voltage.

Subsequently, after 60 seconds of power generation, power generation was stopped. After the stopping, hydrogen gas and air were stopped to be supplied, and the unit cell was purged with air and then held for 50 seconds. Then, hydrogen gas was supplied to the anode side at ⅕ of the utilization rate for 10 seconds, and the anode side was supplied with hydrogen gas and the cathode side was supplied with air, under the same condition as in the above. Then, power generation was re-started for 60 seconds at a current density of 1.0 A/cm$^2$. In this case, load current at this time was increased from 0 A/cm$^2$ to 1.0 A/cm$^2$ over 30 seconds. After executing this power generation-stop operations, cell voltage was measured to evaluate power generation performance. Specifically, cycle number till cell voltage reached 0.45 V at a current density of 1.0 A/cm$^2$ was used as evaluation value of durability.

TABLE 1

| | Anode | | Cathode | | | Intensity ratio of Raman spectrum ($Iw_{1580}/Iw_{1355}$) | |
|---|---|---|---|---|---|---|---|
| | Anode catalyst species | Pt Av. particle diameter (nm) | Cathode catalyst species | Heat treatment condition | Pt Av. particle diameter (nm) | Before heat treatment | After heat treatment |
| Example 1 | Pt (48%)/Ketjenblack EC | 2.6 | Pt (50%)/Ketjenblack EC | $H_2$ 5%/Ar flow at 1000° C. for 30 min | 3.9 | 2.05 | 1.87 |
| Example 2 | Pt (48%)/Ketjenblack EC | 2.6 | Pt (52%)/Ketjenblack EC Pt:Ir = 9:1 | $H_2$ 5%/Ar flow at 1000° C. for 30 min | 4.8 | 2.05 | 1.86 |
| Example 3 | Pt (48%)/Ketjenblack EC | 2.6 | Pt (52%)/Ketjenblack EC | $H_2$ 5%/Ar flow at 1000° C. for 60 min | 4.4 | 2.05 | 1.84 |
| Example 4 | Pt (48%)/Ketjenblack EC | 2.6 | Pt (51%)/Ketjenblack EC | $H_2$ 10%/Ar flow at 1000° C. for 30 min | 4.1 | 2.05 | 1.86 |
| Example 5 | Pt (48%)/Ketjenblack EC | 2.6 | Pt (49%)/Ketjenblack EC | $H_2$ 5%/Ar flow at 500° C. for 60 min | 3.4 | 2.05 | 1.98 |
| Example 6 | Pt (48%)/Ketjenblack EC | 2.6 | Pt (49%)/Ketjenblack EC | Ar flow at 1000° C. for 2 hrs | 3.5 | 2.05 | 2.03 |
| Example 7 | Pt (48%)/Ketjenblack EC | 2.6 | Pt (49%)/Ketjenblack EC | $N_2$ flow at 1000° C. for 4 hrs | 3.4 | 2.05 | 2.02 |
| Example 8 | Pt (48%)/Ketjenblack EC | 2.6 | Pt (51%)/Ketjenblack EC | $O_2$ 100 ppm/Ar flow 400° C. for 30 min | 3.6 | 2.05 | 1.97 |
| Example 9 | Pt (48%)/Ketjenblack EC | 2.6 | Pt (50%)/Vulcan XC-72 | $H_2$ 5%/Ar flow 1000° C. for 30 mi | 4.3 | 2.01 | 1.84 |
| Example 10 | Pt (48%)/Ketjenblack EC | 2.6 | Pt (49%)/Acetylene black | $H_2$ 5%/Ar flow 1000° C. for 30 mi | 4.9 | 1.75 | 1.57 |
| Example 11 | Pt (48%)/Ketjenblack EC | 2.6 | Pt (51%)/KetjenblackJD | $H_2$ 5%/Ar flow 1000° C. 30 mi | 3.8 | 2.14 | 1.93 |
| Example 12 | Pt (48%)/Ketjenblack EC | 2.6 | Pt (51%)/Black Pearl | $H_2$ 5%/Ar flow 1000° C. for 30 mi | 3.4 | 2.12 | 1.87 |
| Example 13 | Pt (28%)/Ketjenblack EC | 2.2 | Pt (50%)/Ketjenblack EC | $H_2$ 5%/Ar flow 1000° C. for 30 mi | 3.9 | 2.05 | 1.87 |
| Example 14 | Pt (14%)/Ketjenblack EC | 1.9 | Pt (50%)/Ketjenblack EC | $H_2$ 5%/Ar flow 1000° C. for 30 mi | 3.9 | 2.05 | 1.87 |
| Example 15 | Pt (48%)/Ketjenblack EC | 2.6 | Pt (50%)/Ketjenblack EC | $H_2$ 5%/Ar flow 1000° C. for 30 mi | 3.9 | 2.05 | 1.87 |
| Example 16 | Pt (28%)/Ketjenblack EC | 2.2 | Pt (50%)/Ketjenblack EC | $H_2$ 5%/Ar flow 1000° C. for 30 mi | 3.9 | 2.05 | 1.87 |
| Example 17 | Pt (28%)/Ketjenblack EC | 2.2 | Pt (50%)/Ketjenblack EC | $H_2$ 5%/Ar flow 1000° C. for 30 mi | 3.9 | 2.05 | 1.87 |
| Com. Exp. 1 | Pt (48%)/Ketjenblack EC | 2.6 | Pt (48%)/Ketjenblack EC | None | 2.6 | 2.05 | 2.05 |
| Com. Exp. 2 | Pt (48%)/Ketjenblack EC | 2.6 | Pt (48%)/Vulcan XC-72 | None | 2.6 | 2.01 | 2.01 |
| Example 18 | Pt (50%)/Ketjenblack EC | 2.6 | Pt (50%)/Ketjenblack EC | Ar flow 1000° C. for 4 hrs | 3.8 | 2.05 | 2.03 |
| Example 19 | Pt (50%)/Ketjenblack EC | 2.6 | Pt (50%)/Vulcan XC72 | Ar flow 1000° C. for 4 hrs | 4.7 | 2.01 | 1.99 |
| Example 20 | Pt (50%)/Ketjenblack EC | 2.6 | Pt (50%)/Acetylene black | Ar flow 1000° C. for 4 hrs | 5.6 | 1.75 | 1.73 |
| Example 21 | Pt (50%)/Ketjenblack EC | 2.6 | Pt (50%)/Graphitized Ketjenblack EC | Ar flow 1000° C. for 4 hrs | 4.9 | 1.55 | 1.55 |
| Example 22 | Pt (50%)/Ketjenblack EC | 2.6 | Pt (50%)/Graphitized Black Pearl | Ar flow 1000° C. for 4 hrs | 4.4 | 1.58 | 1.58 |
| Com. Exp. 3 | Pt (50%)/Ketjenblack EC | 2.6 | Pt (50%)/Ketjenblack EC | None | 2.8 | 2.05 | 2.05 |
| Com. Exp. 4 | Pt (50%)/Ketjenblack EC | 2.6 | Pt (50%)/Vulcan XC-72 | None | 3.2 | 2.01 | 2.01 |

Com. Exp. is Comparative Example

TABLE 2

| | Amount of supported Pt (mg/cm$^2$) | | Anode layer Av. thickness | Cathode layer Av. thickness | Ya/Yc | Anode layer content | Cathode layer content | Ma/Mc | GDL thickness | Cycles of start-stop |
|---|---|---|---|---|---|---|---|---|---|---|
| | Anode | Cathode | Ya (µm) | Yc (µm) | (—) | Ma (mg/cm$^2$) | Mc (mg/cm$^2$) | (—) | (µm) | (Numbers) |
| Example 1 | 0.20 | 0.40 | 6.0 | 14 | 0.43 | 0.20 | 0.40 | 0.50 | 320 | 1,610 |
| Example 2 | 0.20 | 0.40 | 6.0 | 14 | 0.43 | 0.20 | 0.40 | 0.50 | 320 | 1,870 |
| Example 3 | 0.10 | 0.40 | 3.0 | 14 | 0.21 | 0.10 | 0.40 | 0.25 | 180 | 1,770 |
| Example 4 | 0.10 | 0.40 | 3.0 | 14 | 0.21 | 0.10 | 0.40 | 0.25 | 320 | 1,810 |
| Example 5 | 0.10 | 0.40 | 3.0 | 14 | 0.21 | 0.10 | 0.40 | 0.25 | 320 | 1,220 |
| Example 6 | 0.10 | 0.40 | 3.0 | 14 | 0.21 | 0.10 | 0.40 | 0.25 | 320 | 1,030 |
| Example 7 | 0.10 | 0.40 | 3.0 | 14 | 0.21 | 0.10 | 0.40 | 0.25 | 180 | 1,080 |
| Example 8 | 0.10 | 0.40 | 3.0 | 14 | 0.21 | 0.10 | 0.40 | 0.25 | 180 | 1,160 |
| Example 9 | 0.10 | 0.40 | 3.0 | 14 | 0.21 | 0.10 | 0.40 | 0.25 | 180 | 1,720 |
| Example 10 | 0.10 | 0.40 | 3.0 | 14 | 0.21 | 0.10 | 0.40 | 0.25 | 180 | 2,750 |
| Example 11 | 0.10 | 0.40 | 3.0 | 14 | 0.22 | 0.10 | 0.40 | 0.25 | 320 | 1,690 |
| Example 12 | 0.10 | 0.40 | 3.0 | 14 | 0.21 | 0.10 | 0.40 | 0.25 | 320 | 1,720 |
| Example 13 | 0.05 | 0.40 | 2.6 | 14 | 0.18 | 0.05 | 0.40 | 0.13 | 180 | 1,830 |
| Example 14 | 0.10 | 0.40 | 10.3 | 14 | 0.73 | 0.10 | 0.40 | 0.25 | 180 | 1,680 |
| Example 15 | 0.05 | 0.40 | 1.5 | 14 | 0.11 | 0.05 | 0.40 | 0.13 | 180 | 1,850 |
| Example 16 | 0.15 | 0.40 | 7.7 | 14 | 0.55 | 0.15 | 0.40 | 0.38 | 180 | 1,720 |
| Example 17 | 0.20 | 0.40 | 10.3 | 14 | 0.73 | 0.20 | 0.40 | 0.50 | 180 | 1,620 |
| Com. Exm. 1 | 0.40 | 0.40 | 14 | 14 | 1.00 | 0.40 | 0.40 | 1.00 | 320 | 730 |
| Com. Exm. 2 | 0.40 | 0.40 | 14 | 14 | 1.00 | 0.40 | 0.40 | 1.00 | 180 | 760 |

Com. Exp. is Comparative Example

TABLE 3

| | Amount of supported Pt (mg/cm²) | | Anode layer Av. thickness | Cathode layer Av. thickness | Ya/Yc | Anode layer content | Cathode layer content | Ma/Mc | GDL thickness | Cycles of start-stop | Initial Cell Voltage (V@1 A/ |
|---|---|---|---|---|---|---|---|---|---|---|---|
| | Anode | Cathode | Ya (μm) | Yc (μm) | (—) | Ma (mg/cm²) | Mc (mg/cm²) | (—) | (μm) | (Numbers) | cm²) |
| Example 18 | 0.10 | 0.40 | 3.0 | 14 | 0.22 | 0.10 | 0.40 | 0.25 | 320 | 1,690 | 0.605 |
| Example 19 | 0.10 | 0.40 | 3.0 | 14 | 0.21 | 0.10 | 0.40 | 0.25 | 320 | 880 | 0.598 |
| Example 20 | 0.10 | 0.40 | 3.0 | 14 | 0.21 | 0.10 | 0.40 | 0.25 | 320 | 1,050 | 0.584 |
| Example 21 | 0.10 | 0.40 | 3.0 | 14 | 0.21 | 0.10 | 0.40 | 0.25 | 320 | 1,130 | 0.595 |
| Example 22 | 0.10 | 0.40 | 3.0 | 14 | 0.21 | 0.10 | 0.40 | 0.25 | 320 | 2,950 | 0.605 |
| Com. Exm. 3 | 0.40 | 0.40 | 14 | 14 | 1.00 | 0.40 | 0.40 | 1.00 | 320 | 2,760 | 0.612 |
| Com. Exm. 4 | 0.40 | 0.40 | 14 | 14 | 1.00 | 0.40 | 0.40 | 1.00 | 320 | 580 | 0.603 |

Com. Exp. is Comparative Example

It is noted from Tables 1 to 3 that by heat treatment after supporting of a catalyst, durability of a fuel cell comprising an electrode catalyst can be enhanced.

INDUSTRIAL APPLICABILITY

PEFC of the present invention can be used as various power sources. PEFC of the present invention excellent in durability can be used, for example, as a power source for a vehicle.

The entire disclosure of Japanese Patent Application No. 2005-044463 filed on Feb. 21, 2005 including specification, claims, drawings and summary are incorporated herein by reference in its entirety.

The invention claimed is:

1. A method for producing an electrode catalyst which comprises:
    a step of supporting a noble metal catalyst consisting of at least one noble metal on a carbon material; and
    a step for subjecting the carbon material having said noble metal catalyst supported thereon to heat treatment at a temperature of 300 to 1200° C. under inert gas atmosphere without any catalyst component added, after the noble metal has been supported on the carbon material.

2. A method for producing an electrode catalyst according to claim 1, wherein said inert gas is at least one member selected from the group consisting of helium (He), neon (Ne), argon (Ar), krypton (Kr), xenon (Xe) and nitrogen ($N_2$).

3. A method for producing an electrode catalyst according to claim 1, wherein the carbon material having the noble metal catalyst supported thereon is subjected to heat treatment under inert gas atmosphere further containing reducing gas.

4. A method for producing an electrode catalyst according to claim 3, wherein said reducing gas is hydrogen ($H_2$) gas.

5. A method for producing an electrode catalyst according to claim 3, wherein the concentration of reducing gas contained in the inert gas is equal to or less than 50% by volume, relative to the inert gas.

6. A method for producing an electrode catalyst according to claim 5, wherein the concentration of reducing gas contained in the inert gas is equal to or less than 20% by volume, relative to said inert gas.

7. A method for producing an electrode catalyst according to claim 1, wherein the carbon material having a noble metal catalyst supported thereon is subjected to heat treatment under inert gas atmosphere at 400 to 1150° C.

8. A method for producing an electrode catalyst according to claim 7, wherein the carbon material having a noble metal catalyst supported thereon is subjected to heat treatment under inert gas atmosphere at 400 to 600° C.

9. A method for producing an electrode catalyst according to claim 7, wherein the carbon material having a noble metal catalyst supported thereon is subjected to heat treatment under inert gas atmosphere at 900 to 1100° C.

10. A method for producing an electrode catalyst according to claim 1, wherein the carbon material having a noble metal catalyst supported thereon is subjected to heat treatment under inert gas atmosphere further containing oxidizing gas.

11. A method for producing an electrode catalyst according to claim 10, wherein said oxidizing gas is oxygen ($O_2$) gas.

12. A method for producing an electrode catalyst according to claim 10, wherein the concentration of oxidizing gas contained in the inert gas is equal to or less than 5% by volume, relative to the inert gas.

13. A method for producing an electrode catalyst according to claim 12, wherein concentration of oxidizing gas contained in the inert gas is equal to or less than 0.5% by volume, relative to said inert gas.

14. A method for producing an electrode catalyst according to claim 10, wherein the carbon material having a noble metal catalyst supported thereon is subjected to heat treatment under inert gas atmosphere at 300 to 600° C.

15. A method for producing an electrode catalyst according to claim 1, wherein the raw material of said noble metal catalyst is a compound showing strong acidic property in an aqueous solution.

16. A method for producing an electrode catalyst according to claim 1, wherein the raw material of said noble metal catalyst is a noble metal, or chloride, nitrate, or dinitrodiamine salt of the noble metal.

17. A method for producing an electrode catalyst according to claim 1, wherein said carbon material is selected from the group consisting of carbon black, graphitized carbon black, carbon nanotube, carbon nanofiber, carbon nanohorn, and carbon fibril.

18. A method for producing an electrode catalyst according to claim 1, wherein the average particle diameter of said noble metal catalyst after heat treatment is 3 to 8 nm.

19. A method for producing an electrode catalyst according to claim 18, wherein average particle diameter of said noble metal catalyst after heat treatment is 3 to 6 nm.

20. An electrode catalyst produced by a method set forth in claim 1.

21. A method for producing an electrode catalyst according to claim 1, wherein the carbon material is a non-graphitized carbon black.

22. A method for producing an electrode catalyst according to claim 1, wherein said noble metal catalyst is selected among metals including platinum, ruthenium, iridium, rhodium, palladium, osmium, tungsten, lead, iron, chromium, cobalt, nickel, manganese, vanadium, molybdenum, gallium, aluminum; and alloys thereof.

* * * * *

UNITED STATES PATENT AND TRADEMARK OFFICE
CERTIFICATE OF CORRECTION

| | | |
|---|---|---|
| PATENT NO. | : 8,293,671 B2 | Page 1 of 1 |
| APPLICATION NO. | : 11/815805 | |
| DATED | : October 23, 2012 | |
| INVENTOR(S) | : Shinji Yamamoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this
Eighth Day of July, 2014

Michelle K. Lee
*Deputy Director of the United States Patent and Trademark Office*